US009755454B1

(12) United States Patent
Reynov et al.

(10) Patent No.: US 9,755,454 B1
(45) Date of Patent: Sep. 5, 2017

(54) METHODS AND APPARATUS FOR PROVIDING REDUNDANT POWER SUPPLY PROTECTION WITH POWER ZONES FOR ELECTRONIC DEVICES

(71) Applicant: Juniper Networks, Inc., Sunnyvale, CA (US)

(72) Inventors: Boris Reynov, Cupertino, CA (US); Ben T. Nitzan, El Granada, CA (US); Philip Quaife, Santa Clara, CA (US); Shreeram Siddhaye, Sunnyvale, CA (US); Venkata S. Raju Penmetsa, Sunnyvale, CA (US); Jack W. Kohn, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 906 days.

(21) Appl. No.: 13/852,186

(22) Filed: Mar. 28, 2013

(51) Int. Cl.
*H02J 9/06* (2006.01)

(52) U.S. Cl.
CPC ...................... *H02J 9/06* (2013.01)

(58) Field of Classification Search
CPC .......... H02J 9/06; H02J 2003/001; H02J 7/34; H02J 9/00; H02J 9/04; H01H 2300/018; Y02B 10/72; Y02B 90/14; Y04S 20/12; Y04S 20/248; Y10T 307/615
USPC ..................... 307/64, 23; 710/302
See application file for complete search history.

(56) References Cited

U.S. PATENT DOCUMENTS

| | | | | |
|---|---|---|---|---|
| 5,790,394 A * | 8/1998 | Cabaniss | ................. | H02J 1/108 307/82 |
| 6,459,171 B1 * | 10/2002 | Leifer | ....................... | H02J 1/10 307/24 |
| 6,614,133 B2 * | 9/2003 | Belson | ..................... | H02J 1/10 307/29 |
| 6,677,687 B2 * | 1/2004 | Ho | .......................... | G06F 1/189 307/43 |
| 6,735,704 B1 * | 5/2004 | Butka | ...................... | H02J 1/10 307/86 |
| 7,127,542 B2 * | 10/2006 | Parameswaran | ........ | G06F 1/189 710/302 |
| 7,557,461 B2 * | 7/2009 | Kawakubo | ............. | G06F 1/263 307/130 |
| 7,705,488 B2 * | 4/2010 | Clemo | .................... | H02J 1/102 307/64 |
| 7,750,504 B2 * | 7/2010 | Lee | .......................... | G06F 1/26 307/43 |

(Continued)

OTHER PUBLICATIONS

Jonathan Dodge, P.E., Advanced Power Technology, "Power MOSFET Tutorial", Mar. 2, 2006, pp. 1-12.

*Primary Examiner* — Jared Fureman
*Assistant Examiner* — Michael Warmflash
(74) *Attorney, Agent, or Firm* — Cooley LLP

(57) ABSTRACT

In some embodiments, an apparatus includes a set of power supply units where each power supply units from the set of power supply unit is associated with a power zone from a set of power zones. The apparatus can also includes a redundant power supply unit and a set of electronic devices where each electronic device from the set of electronic devices is associated with a power zone from the set of power zones. Additionally, each electronic device from the set of electronic devices is operatively coupled to a power supply unit from the set of power supply units for that power zone and is also operatively coupled to the redundant power supply unit.

20 Claims, 6 Drawing Sheets

(56) References Cited

U.S. PATENT DOCUMENTS

| | | | | |
|---|---|---|---|---|
| 7,898,111 B1* | 3/2011 | Pistel | ............... | H02J 1/102 |
| | | | | 307/82 |
| 7,936,089 B1* | 5/2011 | Gill | ............... | G06F 13/4081 |
| | | | | 307/31 |
| 8,067,857 B2* | 11/2011 | Humphrey | ............... | G06F 1/263 |
| | | | | 307/82 |
| 8,304,930 B2* | 11/2012 | Rogoll | ............... | H02J 1/108 |
| | | | | 307/18 |
| 8,546,977 B2* | 10/2013 | Togare | ............... | H02J 1/102 |
| | | | | 307/112 |
| 2005/0046461 A1* | 3/2005 | Huang | ............... | H02J 1/10 |
| | | | | 327/407 |
| 2008/0191552 A1* | 8/2008 | Suzuki | ............... | G06F 1/263 |
| | | | | 307/23 |
| 2010/0013307 A1* | 1/2010 | Heineman | ............... | G06F 1/26 |
| | | | | 307/33 |
| 2011/0057724 A1* | 3/2011 | Pabon | ............... | H02M 7/219 |
| | | | | 327/581 |
| 2011/0187197 A1* | 8/2011 | Moth | ............... | H02J 9/062 |
| | | | | 307/66 |
| 2012/0098338 A1* | 4/2012 | Lew | ............... | H02J 1/10 |
| | | | | 307/29 |
| 2014/0152011 A1* | 6/2014 | Danielsen | ............... | F03D 7/00 |
| | | | | 290/44 |
| 2014/0191572 A1* | 7/2014 | Hinkle | ............... | H02J 9/00 |
| | | | | 307/23 |

\* cited by examiner

METHODS AND APPARATUS FOR PROVIDING REDUNDANT POWER SUPPLY PROTECTION WITH POWER ZONES FOR ELECTRONIC DEVICES

BACKGROUND

Some embodiments described herein relate generally to methods and apparatus for implementing a redundant power supply system for a set of electronic devices with power supply protection and with no power sharing between the different power supply units. Additionally, some embodiments described herein relate to methods and apparatus for minimizing the current leakage between individual power supply units within a redundant power supply system.

In known electrical systems (or devices), chassis systems use N+1 power supply unit protection. In such systems (or devices), the system connects N+1 power supply units to a common power rail where the power supply units provide power sharing capabilities. In the event of failure of a power supply unit, the load serviced by the failed power supply unit is distributed among the remaining operational power supply units. This approach can lead to fatal single point of failure for the system if the common power rail undergoes failure or a short circuit. Connection of all the power supply units together also increases the risk of catastrophic damages and/or fire in the system (or devices) in case of short circuits occurring due to high current in the common power rail. Additionally, the common power rail method typically involves sophisticated and expensive power supply units with power sharing capabilities. Moreover, the power sharing rails also involve, in many cases, use of power bars that increases system cost in comparison to printed circuit board (PCB) power distribution.

Accordingly, a need exists for methods and apparatus to implement a power supply system for a set of electronic devices with power supply protection and with no power sharing between the different power supply units.

SUMMARY

In some embodiments, an apparatus includes a set of power supply units where each power supply units from the set of power supply unit is associated with a power zone from a set of power zones. The apparatus also includes a redundant power supply unit and a set of electronic devices where each electronic device from the set of electronic devices is associated with a power zone from the set of power zones. Additionally, each electronic device from the set of electronic devices is operatively coupled to a power supply unit from the set of power supply units for that power zone and is also operatively coupled to the redundant power supply unit.

DETAILED DESCRIPTION

In some embodiments, an apparatus includes a set of power supply units where each power supply units from the set of power supply unit is associated with a power zone from a set of power zones. The apparatus also includes a redundant power supply unit and a set of electronic devices where each electronic device from the set of electronic devices is associated with a power zone from the set of power zones. Additionally, each electronic device from the set of electronic devices is operatively coupled to a power supply unit from the set of power supply units for that power zone and is also operatively coupled to the redundant power supply unit.

In some embodiments, an apparatus includes a set of power supply units with each power supply unit from the set of power supply units being associated with a power zone from a set of power zones. The apparatus includes a set of power rails with each power rail from the set of power rails being associated with a power zone from a set of power zones. Each power rail from the set of power rails is configured to be operatively coupled to an electronic device from a set of electronic devices that is associated with that power zone from the set of power zones. The apparatus also includes a redundant power supply unit and a redundant power rail where the redundant power rail is configured to be operatively coupled to each electronic device from the set of electronic devices.

In some embodiments, an apparatus includes a set of controllers where each controller is configured to be operatively coupled to a redundant power supply unit, a power supply unit from a set of power supply units and an electronic device from a set of electronic devices. Each controller from the set of controllers is configured to activate a switch from a set of switches based on a current from the power supply unit for that controller and a current from the redundant power supply unit so that the switch has a first position to connect the power supply unit to the electronic device and a second position to connect the redundant power supply unit to the electronic device.

As used in this specification, the singular forms "a," "an" and "the" include plural referents unless the context clearly dictates otherwise. Thus, for example, the term "an electronic device" is intended to mean a single electronic device or multiple electronic devices.

Figure 1:
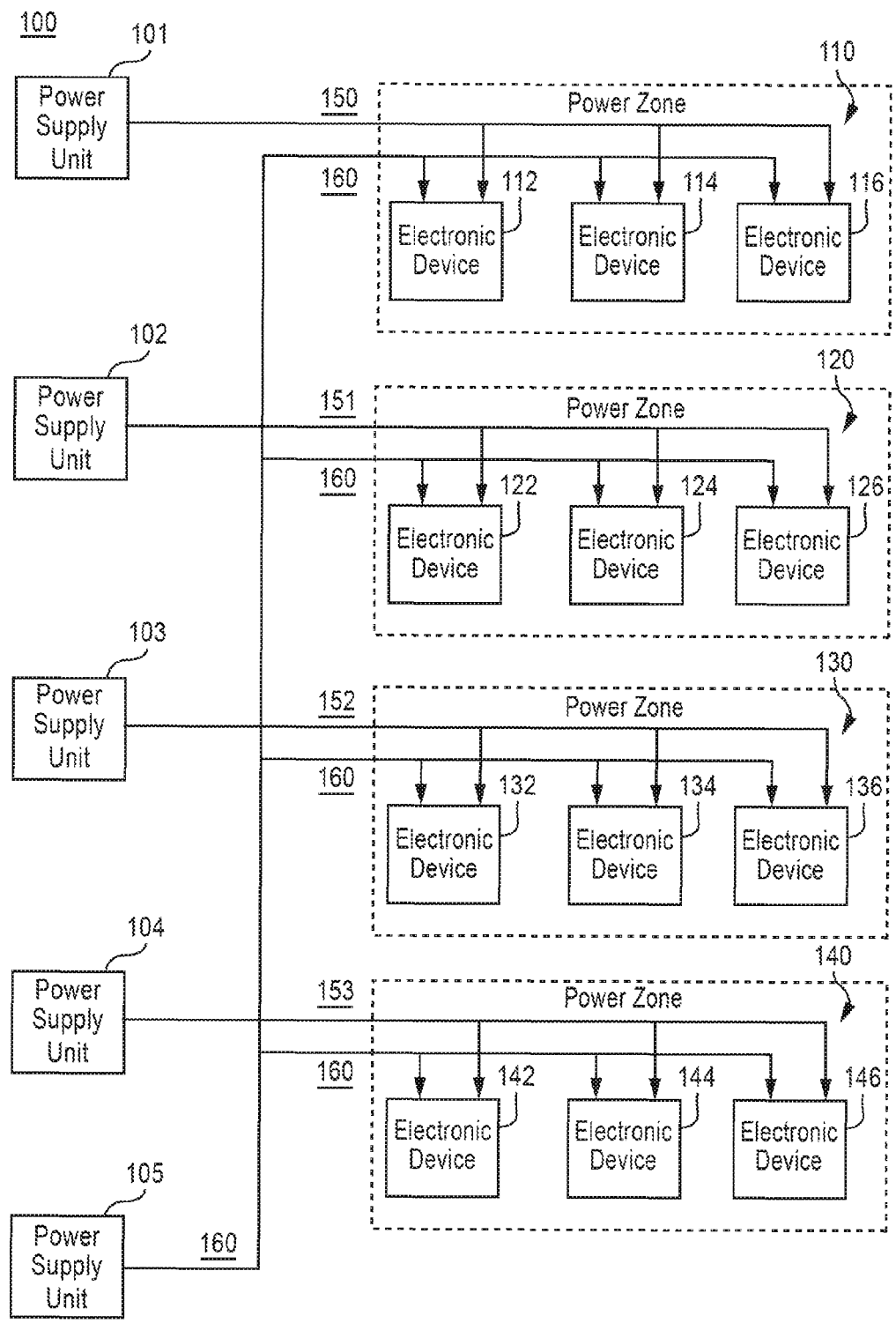
FIG. 1 is a schematic illustration of a power supply system for delivering power to a set of electronic devices that are divided into separate power zones, according to an embodiment.

FIG. 1 is a schematic illustration of a power supply system for delivering power to a set of electronic devices that are divided into separate power zones, according to an embodiment. In this embodiment, the power supply system 100 includes power supply units 101-105 and is divided into four separate power zones such as power zone 110 that includes the electronic devices 112-116, power zone 120 that includes the electronic devices 122-126, power zone 130 that includes the electronic devices 132-136 and power zone 140 that includes the electronic devices 142-146. The power supply units 101-105 can be, for example, any variation of a direct-current (DC) power supply unit. In some instances, the electronic devices 112-116, 122-126, 132-136 and 142-146 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. In other instances, the electronic devices 112-116, 122-126, 132-136 and 142-146 can be, for example, a general purpose processor, a Field Programmable Gate Array (FPGA), an Application Specific Integrated Circuit (ASIC), a Digital Signal Processor (DSP), and/or the like. In yet other instances, the electronic devices 112-116, 122-126, 132-136 and 142-146 can be any other hardware modules and/or devices that can be present in electrical systems.

Among the power supply units, the power supply units 101, 102, 103, 104 are the working power supply units that are responsible for driving the electronic devices in the power zones 110, 120, 130, 140, respectively, and power supply unit 105 is the redundant power supply unit that can drive any of the electronic devices from the set of electronic devices across all the power zones if any of the working power supply units 101-104 fails or becomes un-operational. The power supply unit 101 supplies current and/or power to the electronic devices 112, 114 and 116 in power zone 110 via the working power rail 150. The power supply unit 102 supplies current and/or power to the electronic devices 122, 124 and 126 in power zone 120 via the working power rail 151. The power supply unit 103 supplies current and/or power to the electronic devices 132, 134 and 136 in power zone 130 via the working power rail 152. The power supply unit 104 supplies current and/or power to the electronic devices 142, 144 and 146 in power zone 140 via the working power rail 153. The redundant power supply unit 105 can supply current and/or power to the various electronic devices (in all the power zones 110, 120, 130 and 140) via the redundant power rail 160. Said in another way, the power supply system 100 includes a set of power rails 150-153, where each power rail from the set of power rails 150-153 is uniquely associated with a power zone from the set of power zones 110-140 and is operatively coupled to an electronic device from the set of electronic devices that is associated with that power zone from the set of power zones. Additionally, the power supply system 100 also includes a redundant power rail 160, were the redundant power rail 160 is configured to be operatively coupled to each electronic device from the set of electronic devices (e.g., electronic devices 112-116, 122-126, 132-136, 142, 146).

Because the power supply system 100 shown in FIG. 1 is separated into four separate power zones 110-140, the electronic devices within each power zone is operatively coupled to a separate working power supply unit from the set of working power supply units. Every power zone 110-140 can include one or multiple electronic devices. FIG. 1 shows each power zone 110-140 containing three electronic devices by way of an example, and not by limitation. In other configurations each power zone 110-140 can contain either less than or more than three electronic devices. The number of electronic devices included in a power zone depends on the maximum output power of the of the working power supply unit, the power consumed by each electronic device, and the redundancy requirements of the power supply system 100. Additionally, the electronic devices within each power zone need not be identical devices and hence a wide range of electronic devices can be present within each power zone 110-140.

Both the working power supply units 101-104 and the redundant power supply unit 105 are configured to be turned on (activated) during the system power-up and initialization process. To achieve the proper operation of the power supply system 100, the output voltage level of each working power supply unit from the set of working power supply units 101-104, however, is set to be higher than the output voltage level of the redundant power supply unit 105. The difference in the output voltage levels between the working power supply units 101-104 and the redundant power supply unit 105 can range for example in the tens-hundreds of millivolts (mV). In such instances, only the working power supply units 101-104 can provide power to the electronic devices within the power zones 110-140 associated with the power supply units 101-104. In such instances, the redundant power supply unit 105 does not provide any current or power to any of the electronic devices in the power supply system 100 as long as all the working power supply units 101-104 are operational (the low voltage output of the redundant power supply unit 105 relative to the working power supply units 101-104 prevents the generation of a current from the redundant power supply unit 105).

In some instances, if one of the working power supply units 101-104 fails or becomes un-operational, the voltage output of that working power supply unit becomes 0 V or substantially 0 V. Hence, the voltage difference between the failed working power supply unit 101 or 102 or 103 or 104 and the redundant power supply unit 105 favors the redundant power supply unit 105. In such instances, the redundant power supply unit 105 provides current or power to the electronic devices contained within the power zone associated with the failed working power supply unit 101 or 102 or 103 or 104. The proper operation of the power supply system 100 shown in FIG. 1 depends on the output voltage level difference between the working power supply units 101-104 and the redundant power supply unit 105.

Note that the actual output voltage levels of either the working power supply unit 101-104 or the redundant power supply unit are not critical in successfully implementing the power supply system 100 shown in FIG. 1. The actual output voltage levels of the working power supply units 101-104 can be any arbitrary value as long as those values are greater than the actual output voltage level of the redundant power supply unit 105 and are large enough to meet the power needs of the different electronic devices in the power zones associated with the various working power supply units. To successfully implement of the power supply system 100, the relative difference in the output voltage levels between the working power supply units 101-104 and the redundant power supply unit 105 is established and maintained. In some configurations, the power supply system 100 can employ an adaptive method where voltage sensors are included in each of the working power supply units 101-104 that can detect the output voltage levels of the redundant power supply unit 105 at periodic, substantially periodic or random time intervals (not shown in FIG. 1). In such configurations, the working power supply units 101-104 can adjust their output voltage levels according to any fluctuations in the output voltage levels of the redundant power supply unit 105 to maintain consistently a higher output voltage level than the redundant power supply unit 105. In such configurations, an output from the redundant power rail 160 can be connected to the voltage sensor in each of the working power supply units 101-104, and the working power supply units 101-104 can be configured to adjust their output voltage levels based on the measurements of the voltage sensor.

Figure 2:
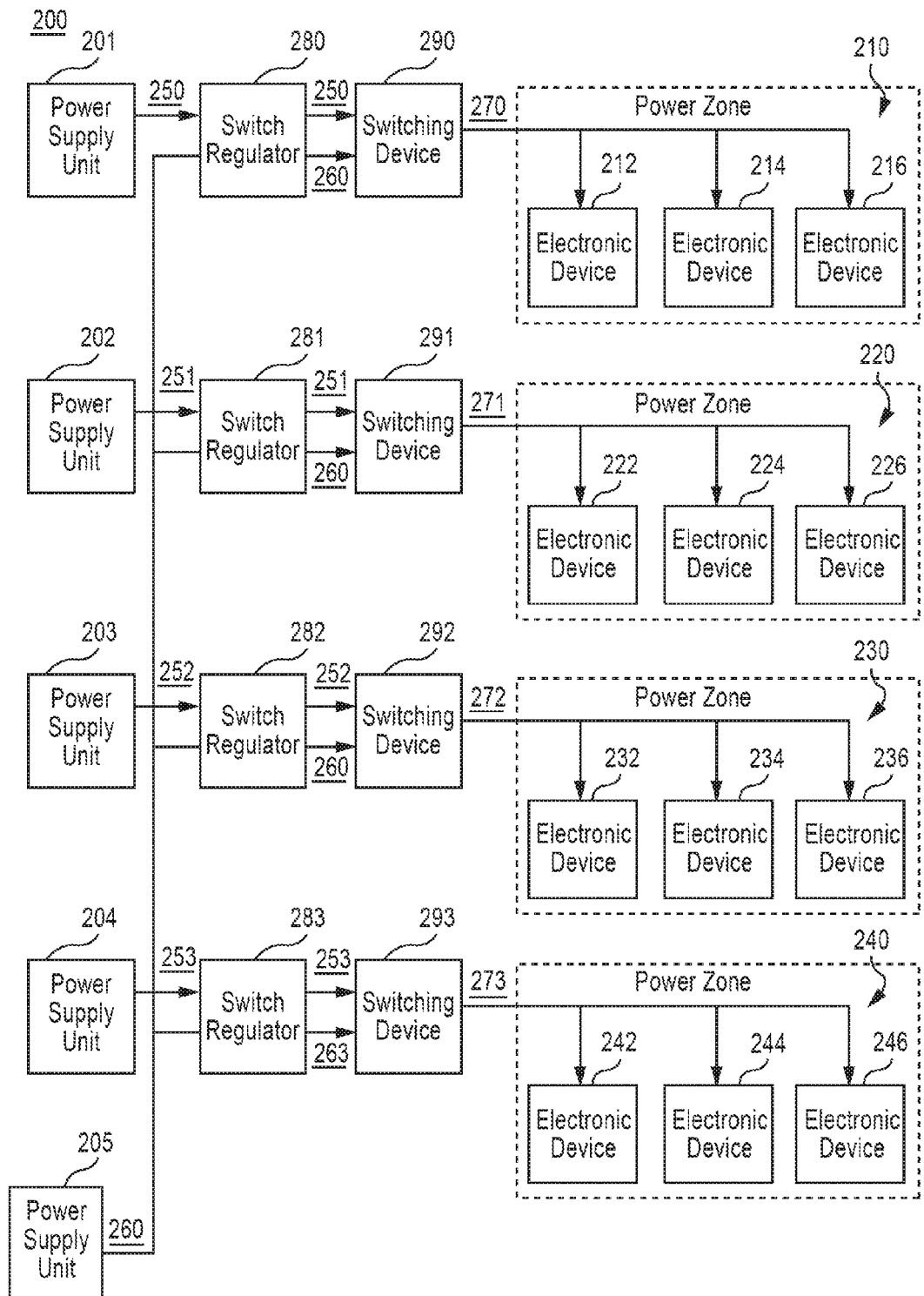
FIG. 2 is a schematic illustration of a power supply system for delivering power to a set of electronic devices that are divided into separate power zones, according to another embodiment.

FIG. 2 is a schematic illustration of a power supply system for delivering power to a set of electronic devices that are divided into separate power zones, according to another embodiment. In this embodiment, the power supply system 200 is similar to the power supply system 100 shown in FIG. 1 with the exception of a switching device 290-293 and a switch regulator 280-283 associated with each working power rail 250-253, and the redundant power rail 260 linked to each of the power zones 210-240. Said in another way, this embodiment of the power supply system includes a set of switching devices 290-293, where each switching device from the set of switching device 290-293 is associated with a power zone from the set of power zones 210-240 that is operatively coupled to the set of electronic devices for that power zone. Each switching device from the set of switching devices 290-293 is operatively coupled to at least one of (1) a working power supply unit for that power zone from the set of working power supply units 201-204, or (2) the redundant power supply unit 260, such that that switching device has a first position or configuration to connect the working power supply unit for that power zone to the electronic devices for that power zone and a second position or configuration to connect the redundant power supply unit to the electronic devices for that power zone.

In the power supply system 200, for power zone 210, the switch regulator 280 is connected to the working power rail 250 and the redundant power rail 260. The two outputs of the switch regulator 280 are also the working power rail 250 and the redundant power rail 260 that serve as inputs to the switching device 290. The output of the switching device 290 is the device power rail 270 that supplies current or power to the electronic devices 212, 214 and 216 in the power zone 210. For power zone 220, the switch regulator 281 is connected to the working power rail 251 and the redundant power rail 260. The two outputs of the switch regulator 281 are also the working power rail 251 and the redundant power rail 260 that serve as inputs to the switching device 291. The output of the switching device 291 is the device power rail 271 that supplies current or power to the electronic devices 222, 224 and 226 in the power zone 220. For power zone 230, the switch regulator 282 is connected to the working power rail 252 and the redundant power rail 260. The two outputs of the switch regulator 282 are also the working power rail 252 and the redundant power rail 260 that serve as inputs to the switching device 292. The output of the switching device 292 is the device power rail 272 that supplies current or power to the electronic devices 232, 234 and 236 in the power zone 230. For power zone 240, the switch regulator 283 is connected to the working power rail 253 and the redundant power rail 260. The two outputs of the switch regulator 283 are also the working power rail 253 and the redundant power rail 260 that serve as inputs to the switching device 293. The output of the switching device 293 is the device power rail 273 that supplies current or power to the electronic devices 242, 244 and 246 in the power zone 240.

In the power supply system 200 shown in FIG. 2, both the working power rails 250-253 and the redundant power rail 260 are connected to the switching devices 290-293 and the switch regulators 280-283 that provide undervoltage protection and overvoltage protection, input current sensing and high current protection, and a metal oxide semiconductor field-effect transistor (MOSFET) switch gate control. The various components of the switching devices and the switch regulators will be discussed in greater detail herein. The switching devices 290-293 and the switch regulators 280-283 allow proper coupling of the electronic devices in each power zone 210-240 with their associated working power rails 250-253 via the device power rails 270-273 when the working power supply units 201-204 are operational. In some instances, the working power rails 250-253 among the different power zones 210-240 can have different output voltage levels. In such instances, the output voltage level differences could result in current leaks between the different power zones 210-240 via the redundant power rail 260. In such instances, however, the switching devices 290-293 and/or the switch regulators 280-283 can be configured to minimize or prevent such current leaks among the different power zones 210-240. The various configurations of the switching devices 290-293 and the switch controllers 280-283 that can prevent unwanted current leaks between different power zones is described in greater detail herein. In the event of failure of a working power supply unit 201 or 202 or 203 or 204, the switching devices 290 or 291 or 291 or 293 and the switch regulator 280 or 281 or 282 or 283, respectively, can allow a smooth transition of power supply from the failed working power rail 250 or 251 or 252 or 253 to the redundant power rail 260.

Figure 3:
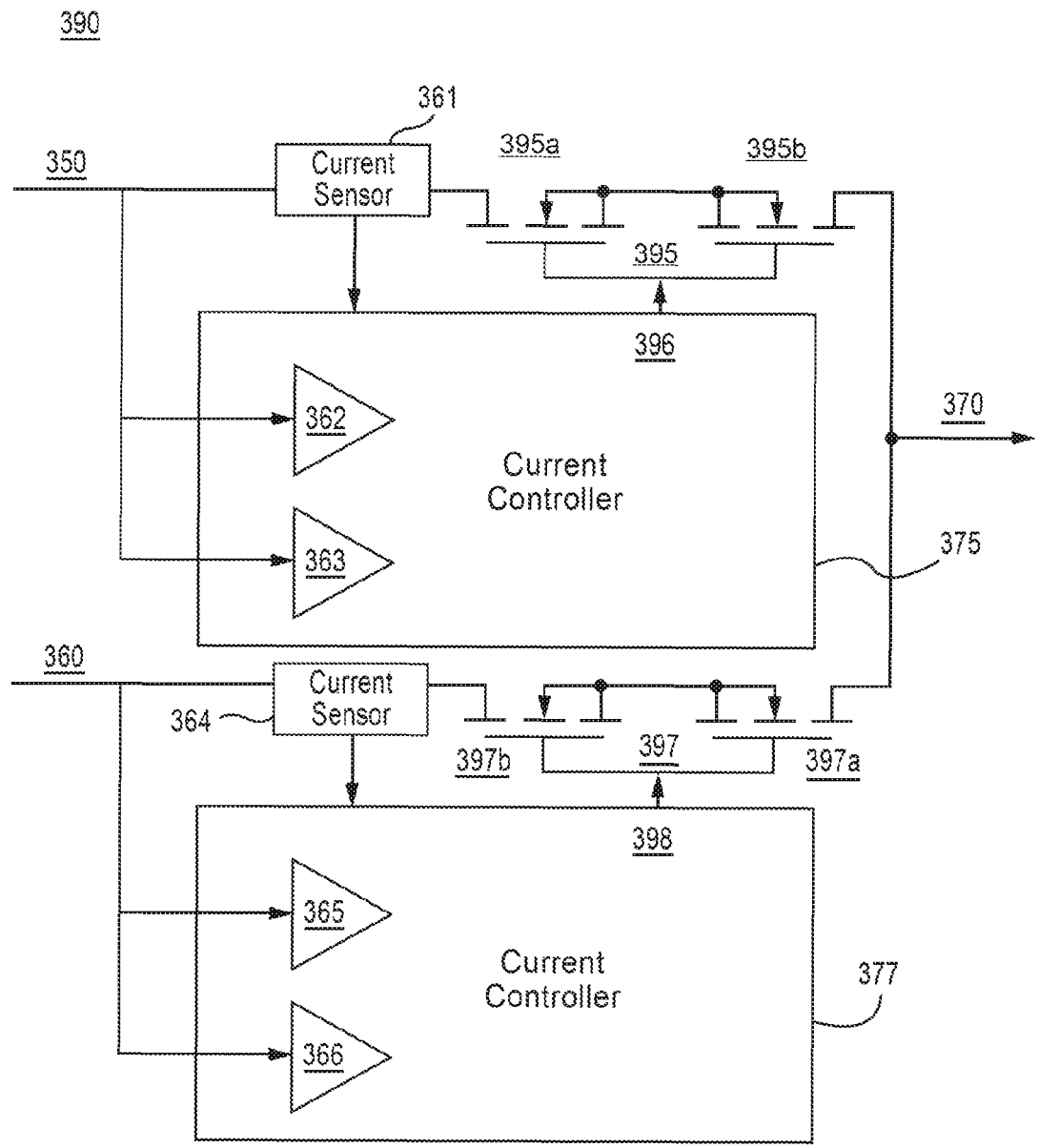
FIG. 3 is a schematic illustration of a switching device, according to an embodiment.

FIG. 3 is a schematic illustration of a switching device, according to an embodiment. The switching device 390 includes an input working power rail 350 operably coupled to a working "hot-plug" in-rush current controller 375 via a current sensor 361, an overvoltage comparator 362 and an undervoltage comparator 363. The working "hot-plug" in-rush current controller 375 also includes a MOSFET gate controller 396 that controls the input gate voltage ($V_g$) for the (symmetrical) MOSFET switch 395 that includes a first MOSFET switch 395a and a second MOSFET switch 395b. The switching device 390 also includes an input redundant power rail 360 operably coupled to a redundant "hot-plug" in-rush current controller 377 via a current sensor 364, an overvoltage comparator 365 and an undervoltage comparator 366. The redundant "hot-plug" in-rush current controller 377 also includes a MOSFET gate controller 398 that controls the input gate voltage ($V_g$) for the (symmetrical) MOSFET switch 397 that includes a first MOSFET switch 397a and a second MOSFET switch 397b. Both the symmetrical MOSFET switches 395 and 397 are operably coupled to the device power rail 370.

In some instances, when the output voltage level at the working rail 350 is greater than the output voltage level at the redundant rail 360, both the symmetrical MOSFET switches 395 and 397 are in the "on" or "closed" configuration. Because the output voltage level at the working rail 350 is greater than the output voltage level at the redundant rail 360, the redundant rail 360 does not provide any current or power to any of the devices in the appropriate power zone via the device power rail 370. In other instances, when the working power rail 350 fails or becomes un-operational due to, for example, a short circuit in the working power rail 350, the output voltage level in the working power rail drops to 0V or substantially 0V. In such instances, the undervoltage comparator 363 and/or the current sensor 361 (a short circuit can lead to high currents passing through the failed working power rail 350) in the working "hot-plug" in-rush current controller 375 can generate a signal that can cause the MOSFET gate controller 396 to stop applying an input gate voltage ($V_g$) to the symmetrical MOSFET switch 395. This causes the symmetrical MOSFET switch 395 to go into the "off" or "open" configuration where any current in the failed working power rail 350 no longer reaches the device power rail 370. In such instances, the output voltage level in the redundant rail 360 can cause the overvoltage comparator 365 and/or the current sensor 364 in the redundant "hot-plug" in-rush current controller 377 to generate a signal that can cause the MOSFET gate controller 398 to keep applying an input gate voltage ($V_g$) to the symmetrical MOSFET switch 397. This causes the symmetrical MOSFET switch 397 to remain in the "on" or "closed" configuration where the redundant power rail 360 is connected to the device rail 370. In such instances, the redundant power rail 360 can supply current and/or power to drive the different electronic devices in the power zone associated with the device power rail 370.

In other instances, when there is a failure (e.g., a short-circuit) of the redundant power rail 360, the undervoltage comparator 366 and/or the current sensor 364 in the redundant "hot-plug" in-rush current controller 377 can generate a signal that can cause the MOSFET gate controller 398 to stop applying an input gate voltage ($V_g$) to the symmetrical MOSFET switch 397. This causes the symmetrical MOSFET switch 397 to go into the "off" or "open" configuration where any current in the failed redundant power rail 360 no longer reaches the device power rail 370. Note that symmetrical MOSFET switches 395 and 397 with charge-pump-gate-control can offer specific advantages against working power rail 350 and/or redundant power rail 360 failures. If individual MOSFET switches were used instead, current can leak from the device power rail 370 into the shorted power rail 350 or 360 via the respective MOSFET switch. This is because typically in MOSFET's, the drain and source of the MOSFET are built it on the substrate and the substrate and source are usually connected together. Hence, the body-drain p-n junction forms an intrinsic diode called the body diode. In such instances, reverse drain (or leak) current cannot be blocked because the body is shorted to the source, providing a high current path through the body diode. The MOSFET body diode creates a path for reverse (leak) current even when a MOSFET switch is in the "off" or "open" configuration. Therefore, if one MOSFET was used in the switching device, and if the working power rail had a short-circuit, the body diode of the MOSFET switch could short the device power rail 370, causing reverse current leaks through the MOSFET body diode, even if the MOSFET switch is turned off or set to the "open" configuration by undervoltage protection. To avoid this scenario, two MOSFETS switches 395a and 395b (symmetrical MOSFET switches) can be connected back-to-back, as shown in FIG. 3, so that their body diodes block each other.

Referring now to FIGS. 2 and 3, the power supply system (e.g., the power supply system 200 in FIG. 2) includes a set of controllers (e.g., the working "hot-plug" in-rush current controller 375 or the redundant "hot-plug" in-rush current controller 377 in FIG. 3), where each controller from the set of controllers is associated with a power zone from the set of power zones (e.g., power zones 210-240 in FIG. 2), and is operatively coupled to the set of electronic devices for that power zone. Additionally, each controller from the set of controllers is operatively coupled to at least one of (1) a working power supply unit from the set of working power supply units for that power zone, or (2) the redundant power supply unit. The power supply system (e.g., the power supply system 200 in FIG. 2) also includes a set of sensors (e.g., current sensors 361 and/or 364 in FIG. 3 or voltage comparators 363, 363, 365 and 366 in FIG. 3), where each sensor from the set of sensors can be uniquely associated with a working power supply unit from the set of working power supply units and can measure at that power zone an output voltage level of the redundant power supply unit. The power supply system (e.g., the power supply system 200 in FIG. 2) can also implement a method such that each working power supply unit from the set of working power supply units (e.g., power supply units 201-204) can be tuned to an output voltage level greater than the output voltage level of the redundant power supply unit 205 at that power zone for proper operation of the power supply system 200. In some configurations, maintaining the voltage level of working power supply units 201-204 above the output voltage level of the redundant power supply unit 205 can be done by hard wire strapping (or implementing any adaptive method) that sets all working power supply unit 201-204 output voltage and the redundant power supply unit 205 output voltage to pre-defined levels. Hard wire strapping is possible, for example, if all the working power supply units 201-204 are implemented using identical power supply units with strapping voltage control. In such configurations, a dedicated and pre-defined position for the redundant power supply unit connector exists. Hence, the output voltage level of the redundant power supply unit 205 can be set to a lower level than the working power supply units 201-204.

Additionally, the power supply system (e.g., the power supply system 200 in FIG. 2) also includes a set of switches (e.g., the symmetrical MOSFET switch 395 and/or 397 contained within the switching device 390 in FIG. 3), where each switch from the set of switches is associated with a power zone from the set of power zones (e.g., power zones 210-240 in FIG. 2) that is operatively coupled to the set of electronic devices for that power zone. Each switch from the set of switches is operatively coupled to (1) a working power supply unit for that power zone from the set of working power supply units, and (2) the redundant power supply unit (e.g., redundant power supply unit 205 in FIG. 2), such that that switch has a first position or configuration to connect the working power supply unit for that power zone to electronic devices for that power zone and a second position or configuration to connect the redundant power supply unit to the electronic devices for that power zone.

Figure 4:
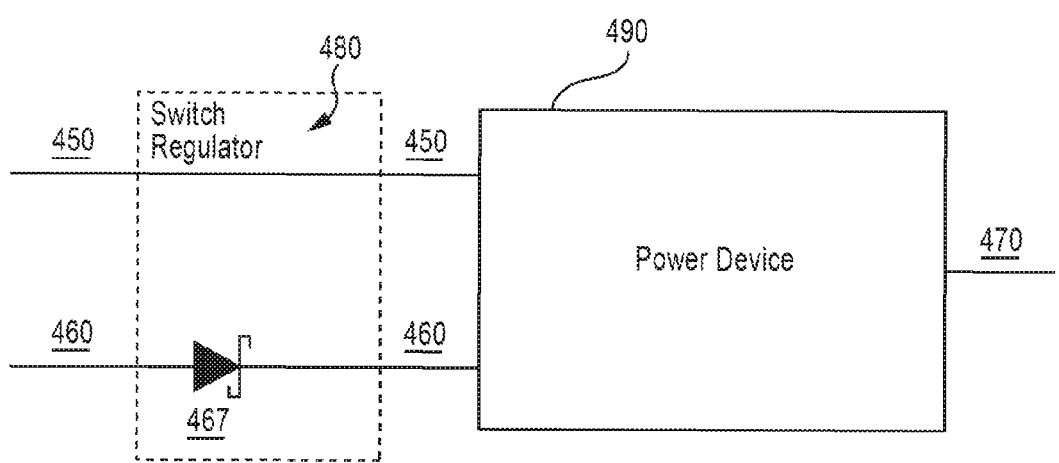
FIG. 4 is a schematic illustration of a switch regulator that is coupled to a switching device, according to an embodiment.

In some instances, the working power rails among the different power zones can have different output voltage levels. In such instances, the output voltage level difference can result in current leaks between the different power zones 210-240 via the redundant power rail 260. In some configurations, preventing or minimizing such unwanted current leakage between the different power zones can be done by implementing a switch regulator that includes a Schottky diode into the redundant power rail. FIG. 4 is a schematic illustration of a switch regulator that is coupled to a switching device, according to an embodiment. The switch regulator 480 has two input channels, namely the working power rail 450 and the redundant power rail 460. The output of the switch regulator 480 are also the working power rail 450 and the redundant power rail 460 that feeds into the input channels of the switching device 490. The switch regulator 480 includes a Schottky diode 467 on the redundant power rail 460. The Schottky diode 467 is formed from a metal-semiconductor junction rather than the typical semiconductor p-n junctions used in conventional diodes. The metal-semiconductor junction reduces the capacitance across the depletion junction and hence Schottky diodes have a low forward voltage drop. This increases switching speeds in Schottky diodes and makes Schottky diodes very useful in high sensitivity applications. In the event of failure of the working power rail 450, the Scottky diode 467 can allow for fast switching of the power supply to the electronic devices to the redundant power rail 460 with minimum loss of performance or damage to the electronic devices. Additionally, the Schottky diode 467 can effectively block any possible current leakage between the device power rails in different power zones (e.g., current leakage between device power rail 270 in power zone 210 and device power rail 271 in power zone 220 in FIG. 2) via the redundant power rail (e.g., redundant power rail 260 in FIG. 2). This method of minimizing or preventing leakage current between the device power rails in different power zones is effective for low driving currents (e.g., currents<20A range). For higher driving current values (e.g., currents≥100 A), however, this method results in large power dissipation across the Schottky diode 467 in instances when the redundant power rail 460 is sourcing or supplying current to the different electronic devices in the appropriate power zone via the switch regulator 480 and the switching device 490 (i.e., in case of failure of the working power rail 450). Commercially available high current Schottky diodes, typically, have a maximum forward voltage at high current of 0.3-0.4V that results in 30-40 W power dissipation when the Schottky diode is operating at 100A.

Figure 5:
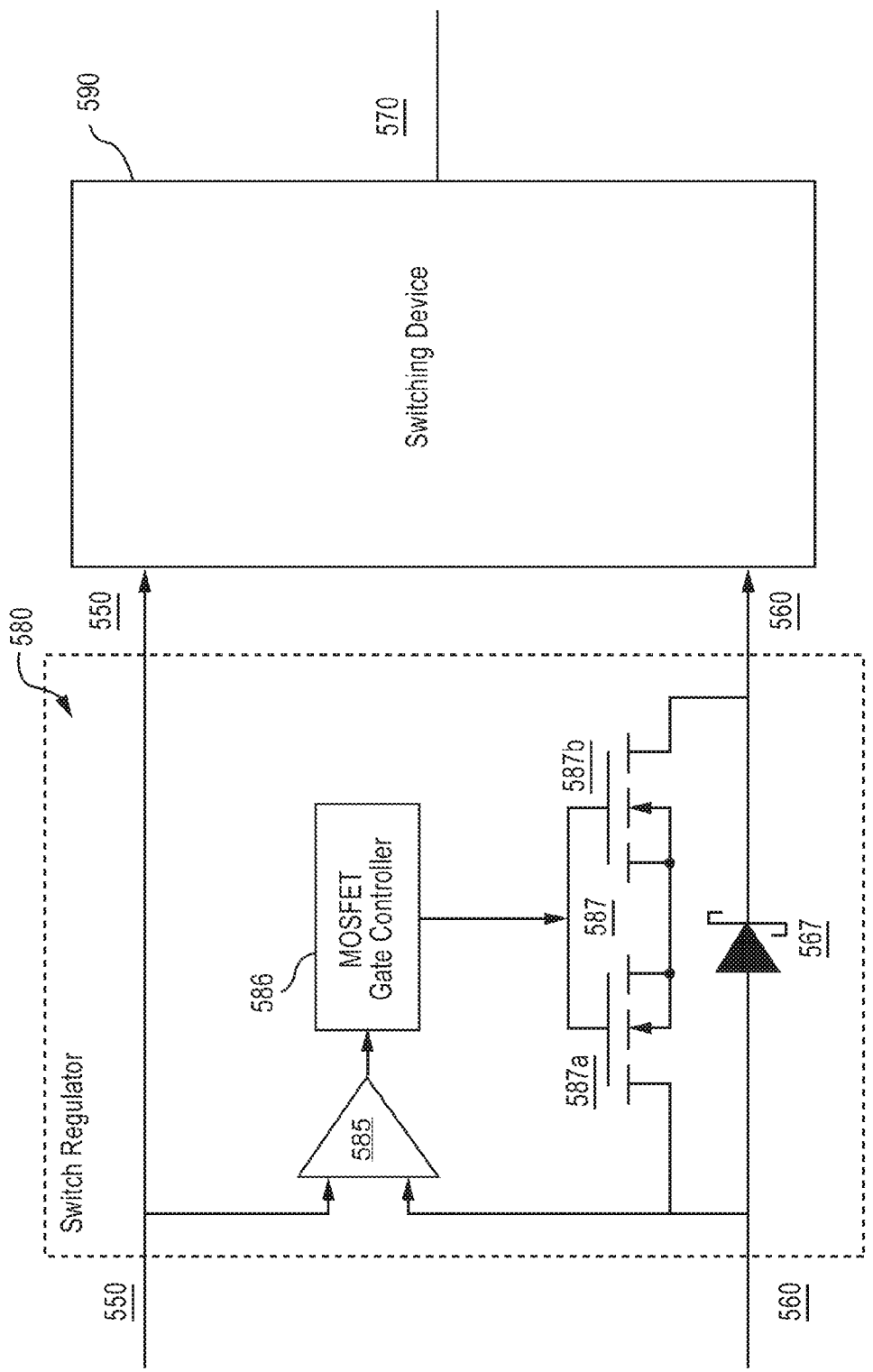
FIG. 5 is a schematic illustration of a switch regulator that is coupled to a switching device, according to another embodiment.

FIG. 5 is a schematic illustration of a switch regulator that is coupled to a switching device, according to another embodiment. In this embodiment, the switch regulator 580 has two input channels, namely the working power rail 550 and the redundant power rail 560. The switch regulator 580 includes a comparator 585, a MOSFET gate controller 586, a symmetrical MOSFET switch 587 that includes a first MOSFET switch 587*a* and a second MOSFET switch 587*b*, and a Schottky diode 567 on the redundant power rail 560. In this embodiment, the symmetric MOSFET switch 587 is connected in parallel with the Schottky diode 567. The output of the switch controller 550 and 560 are the input of the switching device 590. Hence, the switch regulator 580 connects the working power rail 550 to the working "hot-plug" in-rush current controller of the switching device 590 and the redundant power rail 560 to the redundant "hot-plug" in-rush current controller of the switching device 590.

In some instances, when the output voltage level of the working power rail 550 is greater than the redundant power rail 560, the (voltage) comparator 585 compares the output voltage levels on the two power rails 550 and 560 and sends a signal to the MOSFET gate controller 586 to stop applying an input gate voltage ($V_g$) to the symmetrical MOSFET switch 587. This causes the symmetrical MOSFET switch 587 to go into the "off" or "open" configuration. In such a configuration, the redundant power rail 560 is not connected to the symmetrical MOSFET switch 587, and the redundant power rail 560 is connected to the redundant "hot-plug" in-rush current controller of the switching 590 via the Schottky diode 567. Hence, while the symmetrical MOSFET switch 587 is in the "off" or "open" configuration, the redundant power rail 560 does not source or sink any current to the device power rail 570. In other instances, when the working power rail 550 fails or becomes un-operational due to, for example, a short circuit in the working power rail 550 and/or damage in the working power supply unit associated with the working power rail 550, the output voltage level in the working power rail drops to 0 V or substantially 0 V. In such instances, the (voltage) comparator 585 compares the output voltage levels on the two power rails 550 and 560 and sends a signal to the MOSFET gate controller 586 to apply an input gate voltage ($V_g$) to the symmetrical MOSFET switch 587. This causes the symmetrical MOSFET switch 597 to go into the "on" or "closed" configuration. In such instances, the redundant power rail 560 begins to source current and/or power. In the "on" configuration, the symmetrical MOSFET switch 597 steers current away from the Schottky diode 567 and then defines a pathway for the redundant power rail 560 to supply current to the device power rail 570 via the switching device 590 (without including Schottky diode 567). Commercially available MOSFET switches have at best, a static drain-source on-resistance in the range of fractions of mΩ. For example, at 1 mΩ drain-source on-resistance, the MOSFET switch working at a driving current of 100 A dissipates 10 W of power (as opposed to the 30-40 W power dissipation at the Schottky diode). Hence, the power dissipation when current passes through the MOSFET switch 587 is significantly lower than when the current passes through the Schottky diode as described above.

Referring now to FIGS. 2-5, the switch regulator 580 in the embodiment shown in FIG. 5 can be implemented as the switch regulator 280 in the power supply system 200 shown in FIG. 2, and the switching device 390 in the embodiment shown in FIG. 3 can be implemented as the switching device 290 in the power supply system 200 shown in FIG. 2. Hence, in such configurations, the power supply system 200 can include a set of controllers (e.g., either the MOSFET gate controller 586 in FIG. 5, the working "hot-plug" in-rush current controller 375 in FIG. 3 or the redundant "hot-plug" in-rush current controller 377 in FIG. 3) where each controller from the set of controllers is associated with a power zone from a set of power zones. The power supply system 200 can include a set of power rails (e.g., power rails 250-253 in FIG. 2), where each power rail from the set of power rails is associated with a power zone from the set of power zones and is operatively coupled to the set of electronic devices that is associated with that power zone from the set of power zones. The power supply system 200 includes a redundant power rail (e.g. redundant power rail 260 in FIG. 2), where the redundant power rail is operatively coupled to each electronic device from the set of electronic devices. The power supply system 200 also includes a set of comparators (e.g. comparator 585 in FIG. 5, overvoltage comparator 362 in FIG. 3 and/or undervoltage comparator 363 in FIG. 3), where each comparator from the set of comparators is associated with a power zone from the set of power zones that is operatively coupled to a (working) power rail from the set of (working) power rails for that power zone and can also be operatively coupled to the redundant power rail. Additionally, each controller from the set of controllers is operatively coupled to a comparator from the set of comparators for that power zone. The power supply system 200 can also include a set of switches (e.g., symmetrical MOSFET switch 587 in FIG. 5, or the symmetrical MOSFET switch 395 in FIG. 3), where each switch from the set of switches is associated with a power zone from the set of power zones and is operatively coupled to the controller from the set of controllers for that power zone. The power supply system 200 further includes a set of diodes (e.g., Schottky diode 567 in FIG. 5 and Schottky diode 467 in FIG. 4), where each diode from the set of diodes is associated with a power zone from the set of power zones and is operatively coupled to the redundant power rail and the switch and/or the switching device from the set of switches and/or switching devices for that power zone.

Figure 6:
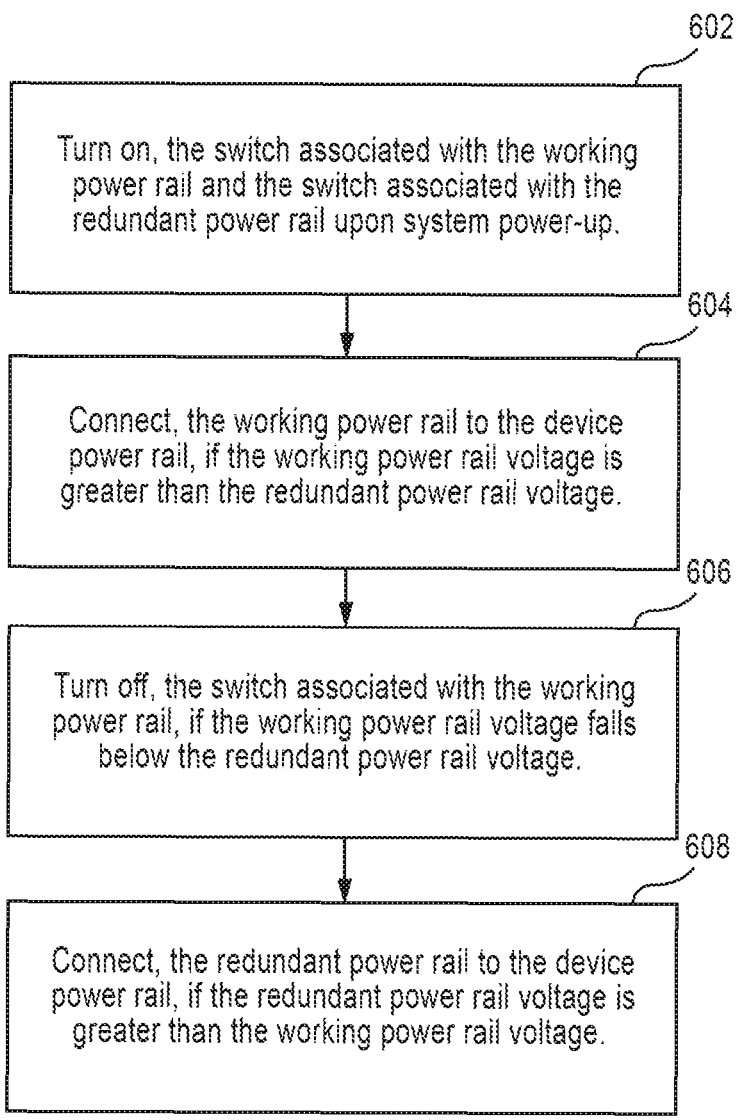
FIG. 6 is a flow chart illustrating a method for supplying power to electronic devices in a power zone from a working power rail or a redundant power rail, according to an embodiment.

FIG. 6 is a flow chart illustrating a method for supplying power to electronic devices in a power zone from a working power rail or a redundant power rail, according to an embodiment. The method 600 includes turning on (activating) the switch associated with the working power rail and the switch associated with the redundant power rail upon system power-up, at 602. As described above, during system power-up the MOSFET gate controller can apply a input gate voltage ($V_g$) to the (symmetrical) MOSFET switches such that the MOSFET switches are in the "closed" or "on"

configuration. Keeping both the working power rail and the redundant power rail in the operational mode upon system power-up can ensure proper functioning of the power supply system as described above. The criterion that dictates whether to use the working power rail or the redundant power rail to supply current to the electronic devices in a power zone is the difference in the output voltage value between the working power supply unit and redundant power supply unit.

At 604, the working power rail is connected to the device power rail if the working power rail voltage is greater than the redundant power rail voltage. As described above, the voltage comparators in the switch regulators and/or switching devices can detect the output voltage value in the working power rail and the redundant power rail. Typically, when the working power rail and the working power supply unit are fully functional, the power supply system is configured such that the output voltage level of the working power supply unit is greater than the redundant power supply unit. In such cases, the working power supply unit supplies current to the various electronic devices in the power zone. Because the output voltage level in the redundant power supply unit (and also the redundant power rail) is lower than the working power supply, the redundant power supply unit does not source or sink any current.

At 606, the switch associated with the working power rail is set to the "open" or "off" configuration if the working power rail output voltage falls below the redundant power rail output voltage. As described above, in some instances, the voltage output level in the working power rail can fall below the voltage output level in the redundant power rail. This can occur, for example, when a short circuit in the working power rail occurs and/or any malfunction in the working power supply unit occurs. In such instances, the voltage comparators in the switch regulators and/or the switching devices can send a signal to the MOSFET gate controller to stop applying an input gate voltage ($V_g$) to the symmetrical MOSFET switch associated with the working power rail. This causes the symmetrical MOSFET switch to go into the "off" or "open" configuration. In such a configuration, the working power rail is not connected to the device power rail and so does not supply any current to the different electronic devices in that power zone.

At 608, the redundant power rail is connected to the device power rail if the redundant power rail output voltage value is greater than the working power rail output voltage value. In such instances, the redundant power supply unit supplies current to the different electronic devices in that power zone. As described above, when the voltage comparators in the switch regulators and/or the switching devices detect the higher output voltage level in the redundant power rail when compared to the working power rail, a signal is sent from the voltage comparator to the MOSFET gate controller associated with the redundant power rail. This signal can cause the MOSFET gate controller to continue to apply an input gate voltage ($V_g$) to the symmetrical MOSFET switch associated with the redundant power rail. This causes the symmetrical MOSFET switch to remain the "on" or "closed" configuration. In such instances, the redundant power rail is connected to the device power rail and begins to supply current and/or power to the different electronic devices in that power zone.

The power supply system described in FIGS. 1-6 provides a range of advantages when implemented in supplying power to multiple electronic devices in an electrical system. For example, the power supply system described in FIGS. 1-6 removes single point of failure on a common power bar, can use cheaper and less complicated power supply units, can split one big power rail into several smaller power rails that can make power distribution easier and cheaper (e.g., using PCB power delivery instead of using power bars), and improve system safety related to short-circuit failures (e.g., fire danger, meltdowns, splashing, etc.). In addition, if vital system resources are distributed between different power zones (or partitions), then in the case of failure of one working power rail, the power system can still be partially operational even if there is a failure of absence of the redundant power rail. Because the power supply system described in FIGS. 1-6 does not have any power sharing requirements between different working power supply units, the power supply system can be implemented with unregulated power supply units (e.g., ratio converters) that can result in higher efficiency, higher power density and lower cost than the use of regulated power supply units. The power supply system described in FIGS. 1-6 can also block leakage current between the different power zones via the redundant power rail, provide smooth transition between the working power rail and the redundant power rail without any current surges on the redundant power rail, and can reduce power dissipation and/or thermal losses across the Schottky diodes during operation of the redundant power rail.

As discussed above, the electronic devices 112-116, 122-126, 132-136 and 142-146 in power supply system shown in FIG. 1 (and/or electronic devices 212-216, 222-226, 232-236 and 242-246 shown in FIG. 2) can be any hardware modules and/or devices that can be present in electrical systems. In one example, the electronic devices 112-116, 122-126, 132-136 and 142-146 in power supply system shown in FIG. 1 (and/or electronic devices 212-216, 222-226, 232-236 and 242-246 shown in FIG. 2) can be servers, storage devices, gateways, workstations, layer-2 or layer-3 switching devices, layer-3 routing devices, access switches, edge devices, top-of-rack devices, input/output modules, or other network devices in a portion of a data center fabric, a local area network (LAN), a wide area network (WAN), a storage area network (SAN), an intranet, and/or the Internet.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
 a plurality of power supplies, each power supply from the plurality of power supplies being associated with a power zone from a plurality of power zones;
 a redundant power supply, an output voltage level from a plurality of output voltage levels for each power supply from the plurality of power supplies being adjustable based on an output voltage level of the redundant power supply,
 a plurality of controllers, each controller from the plurality of controllers associated with a power supply from the plurality of power supplies and configured to adjust an output voltage level from the plurality of output voltage levels for that power supply, and
 a plurality of electronic devices, each electronic device from the plurality of electronic devices being associated with a power zone from the plurality of power zones, each electronic device from the plurality of electronic devices being operatively coupled to a power supply from the plurality of power supplies for that power zone and operatively coupled to the redundant power supply.

2. The apparatus of claim 1,
 wherein each controller from the plurality of controllers is associated with a power zone from the plurality of power zones, operatively coupled to an electronic device from the plurality of electronic devices for that power zone and operatively coupled to at least one of (1) a power supply from the plurality of power supplies for that power zone, or (2) the redundant power supply.

3. The apparatus of claim 1, further comprising:
 a plurality of diodes, each diode from the plurality of diodes associated with a power zone from the plurality of power zones and operatively coupled to an electronic device from the plurality of electronics for that power zone and the redundant power supply.

4. The apparatus of claim 1, further comprising:
 a plurality of switches, each switch from the plurality of switches associated with a power zone from the plurality of power zones, operatively coupled to an electronic device from the plurality of electronics for that power zone, operatively coupled to at least one of (1) a power supply for that power zone from the plurality of power supplies, or (2) the redundant power supply, such that switch has a first position to connect the power supply for that power zone to the electronic device for that power zone and a second position to connect the redundant supply to the electronic device for that power zone.

5. The apparatus of claim 1, wherein:
 each power supply from the plurality of power supplies having an output voltage level from the plurality of output voltage levels higher than the output voltage level of the redundant power supply while that power supply from the plurality of power supplies is connected to the electronic device for that power zone from the plurality of electronic devices.

6. The apparatus of claim 1, further comprising:
 a plurality of sensors, each sensor from the plurality of sensors being uniquely associated with a power supply from the plurality of power supplies and configured to measure at that power zone the output voltage level of the redundant power supply;
 each power supply from the plurality of power supplies configured to be tuned an output voltage level of that power supply to be greater than the output voltage level of the redundant power supply.

7. The apparatus of claim 1, further comprising:
 a first plurality of sensors, each sensor from the first plurality of sensors being uniquely associated with a power zone from the plurality of power zones;
 a first plurality of switches, each switch from the first plurality of switches associated with a power zone from the plurality of power zones, operatively coupled to an electronic device from the plurality of electronics for that power zone, and operatively coupled to at least one of a power supply for that power zone from the plurality of power supplies;
 the plurality of controllers being a first plurality of controllers, each controller from the first plurality of controllers associated with a power zone from the plurality of power zones, operatively coupled to a sensor from the first plurality of sensors for that power zone and operatively coupled to the switch from the plurality of switches for that power zone;
 a plurality of diodes, each diode from the plurality of diodes associated with a power zone from the plurality of power zones;
 a second plurality of sensors, each sensor from the second plurality of sensors being uniquely associated with a power zone from the plurality of power zones;
 a second plurality of switches, each switch from the second plurality of switches associated with a power zone from the plurality of power zones, operatively coupled to an electronic device from the plurality of electronics for that power zone, and operatively coupled to the redundant power supply; and
 a second plurality of controllers, each controller from the second plurality of controllers associated with a power zone from the plurality of power zones, operatively coupled to a sensor from the second plurality of sensors for that power zone and operatively coupled to the switch from the second plurality of switches for that power zone.

8. The apparatus of claim 1, further comprising:
 a plurality of power rails, each power rail from the plurality of power rails being associated with a power zone from the plurality of power zones and configured to be operatively coupled to an electronic device from the plurality of electronic devices that is associated with that power zone from the plurality of power zones; and a redundant power rail, the redundant power rail configured to be operatively coupled to each electronic device from the plurality of electronic devices.

9. The apparatus of claim 1, further comprising:

a plurality of power rails, each power rail from the plurality of power rails being associated with a power zone from the plurality of power zones and configured to be operatively coupled to an electronic device from the plurality of electronic devices that is associated with that power zone from the plurality of power zones;

a redundant power rail, the redundant power rail configured to be operatively coupled to each electronic device from the plurality of electronic devices;

a plurality of comparators, each comparator from the plurality of comparators being associated with a power zone from the plurality of power zones and configured to be operatively coupled to a power rail from the plurality of power rails for that power zone and configured to be operatively coupled to the redundant power rail;

each controller from the plurality of controllers being associated with a power zone from the plurality of power zones and configured to be operatively coupled to a comparator from the plurality of comparators for that power zone;

a plurality of switches, each switch from the plurality of switches being associated with a power zone from the plurality of power zones and configured to be operatively coupled to the controller from the plurality of controllers for that power zone;

a plurality of diodes, each diode from the plurality of diodes being associated with a power zone from the plurality of power zones and configured to be operatively coupled to the redundant power rail and the switch from the plurality of switches for that power zone.

10. An apparatus, comprising:

a plurality of power supplies, each power supply from the plurality of power supplies being associated with a power zone from a plurality of power zones;

a plurality of power rails, each power rail from the plurality of power rails being associated with a power zone from a plurality of power zones, each power rail from the plurality of power rails configured to be operatively coupled to an electronic device from a plurality of electronic devices that is associated with that power zone from the plurality of power zones;

a redundant power supply, an output voltage level from a plurality of output voltage levels for each power supply from the plurality of power supplies being adjustable based on an output voltage level of the redundant power supply;

a plurality of controllers, each controller from the plurality of controllers associated with a power supply from the plurality of power supplies and configured to adjust an output voltage level from the plurality of output voltage levels for that power supply; and a redundant power rail, the redundant power rail configured to be operatively coupled to each electronic device from the plurality of electronic devices.

11. The apparatus of claim 10, wherein each controller from the plurality of controllers associated with a power zone from the plurality of power zones, operatively coupled to an electronic device from the plurality of electronic devices for that power zone and operatively coupled to at least one of (1) a power supply from the plurality of power supplies for that power zone, or (2) the redundant power supply.

12. The apparatus of claim 10, further comprising:

a plurality of diodes, each diode from the plurality of diodes associated with a power zone from the plurality of power zones and operatively coupled to an electronic device from the plurality of electronics for that power zone and the redundant power supply.

13. The apparatus of claim 10, further comprising:

a plurality of switches, each switch from the plurality of switches associated with a power zone from the plurality of power zones, operatively coupled to an electronic device from the plurality of electronics for that power zone, operatively coupled to at least one of (1) a power supply for that power zone from the plurality of power supplies, or (2) the redundant power supply, such that that switch has a first position to connect the power supply for that power zone to the electronic device for that power zone and a second position to connect the redundant supply to the electronic device for that power zone.

14. The apparatus of claim 10, wherein:

each power supply from the plurality of power supplies having an output voltage level from the plurality of output voltage levels higher than the output voltage level of the redundant power supply while that power supply from the plurality of power supplies is connected to the electronic device for that power zone from the plurality of electronic devices.

15. The apparatus of claim 10, wherein:

each controller from the plurality of controllers is a metal oxide semiconductor field-effect transistor (MOSFET) controller and the switch from the plurality of switches for that controller is a symmetrical MOSFET switch.

16. An apparatus, comprising:

a plurality of controllers, each controller configured to be operatively coupled to a redundant power supply, a power supply from a plurality of power supplies and an electronic device from a plurality of electronic devices;

each controller from the plurality of controllers configured to tune an output voltage level of the power supply from the plurality of power supplies associated with that controller to be greater than an output voltage level of the redundant power supply, each controller from the plurality of controllers configured to activate a switch from a plurality of switches based on a current from the power supply for that controller and a current from the redundant power supply so that the switch has a first position to connect the power supply to the electronic device and a second position to connect the redundant supply to the electronic device.

17. The apparatus of claim 16, further comprising:

a plurality of sensors, each sensor from the plurality of sensors being uniquely associated with a power supply from the plurality of power supplies and configured to measure the output voltage level of the redundant power supply.

18. The apparatus of claim 16, further comprising:

a plurality of power rails, each power rail from the plurality of power rails being configured to be operatively coupled to one electronic device from the plurality of electronic devices; and a redundant power rail, the redundant power rail configured to be operatively coupled to each electronic device from the plurality of electronic devices.

19. The apparatus of claim 16, wherein each controller from the plurality of controllers is associated with a power zone from a plurality of power zones, the method further comprising:
- a plurality of power rails, each power rail from the plurality of power rails being associated with a power zone from the plurality of power zones and configured to be operatively coupled to an electronic device from the plurality of electronic devices that is associated with that power zone from the plurality of power zones;
- a redundant power rail, the redundant power rail configured to be operatively coupled to each electronic device from the plurality of electronic devices;
- a plurality of comparators, each comparator from the plurality of comparators being associated with a power zone from the plurality of power zones and configured to be operatively coupled to a power rail from the plurality of power rails for that power zone and configured to be operatively coupled to the redundant power rail, each controller from the plurality of controllers operatively coupled to a comparator from the plurality of comparators for that power zone;
- a plurality of switches, each switch from the plurality of switches being associated with a power zone from the plurality of power zones and configured to be operatively coupled to the controller from the plurality of controllers for that power zone; and
- a plurality of diodes, each diode from the plurality of diodes being associated with a power zone from the plurality of power zones and configured to be operatively coupled to the redundant power rail and the switch from the plurality of switches for that power zone.

20. The apparatus of claim 16, wherein:
each controller from the plurality of controllers is a metal oxide semiconductor field-effect transistor (MOSFET) controller and the switch from the plurality of switches for that controller is a symmetrical MOSFET switch.

* * * * *